Patented Nov. 5, 1940

2,220,775

UNITED STATES PATENT OFFICE 2,220,775

CERAMIC MATERIAL

Louis Navias, Schenectady, N. Y., assignor to General Electric Company, a corporation of New York No Drawing. Application December 30, 1937, Serial No. 182,564

10 Claims. (Cl. 106—12)

This invention relates broadly to ceramic materials. More specifically the invention is concerned with, and has as a principal object to provide a novel sintered or fired ceramic insulating material containing titanium dioxide and having a high dielectric constant and a low power factor.

There has been a growing need in the electrical art for insulating materials of the ceramic type that are mechanically strong, of high dielectric strength and, in addition, of high dielectric constant and low dielectric loss under high frequency. It has been suggested heretofore that a high proportion of titania (titanium dioxide) be incorporated in ceramic compositions to provide electrically insulating materials of high dielectric constant. In all cases a binder or flux for the titania is required. Bentonite and other plastic clayey and clay-like substances previously have been proposed as components of the ceramic body in order to bond the titanium dioxide particles into a solid mass. Alkali compounds are commonly present in such binders. Since alkali-containing substances generally have a detrimental effect upon the electrical properties of an insulating material, great care had to be exercised in the selection of the clayey binder and only the smallest possible amount necessary to produce the desired bond was used. Otherwise the electrical values were adversely affected to an excessive extent. Yet even with these precautions the requirements of the electrical art for ceramic materials for particular applications have not been wholly fulfilled.

In my co-pending application Serial No. 182,563, filed concurrently herewith, I disclosed and claimed ceramic materials comprising titanium dioxide and calcium titanium silicate. Such materials are characterized by their high dielectric constant and low power factor.

In accordance with the present invention improved clay-free ceramic insulating materials are made by incorporating in the composition a preformed glass adapted to bond titanium dioxide particles and to produce a dense, homogeneous mass of high dielectric strength. Glasses used in practicing the present invention are substantially alkali-free. In general, the components are so selected and proportioned as to provide a glass which, when pulverized and mixed with titania particles, will melt in place and bond said particles when the mix is heated to a temperature of at least 1000° C. Preferably I employ a glass having a softening point such as to bond titania particles upon heating the titania-glass mixture within the range of 1150° to 1450° C.

The following examples are illustrative of how the present invention may be carried into effect:

EXAMPLE 1

Preparation of glass

| | Parts by weight |
|---|---|
| Silica ($SiO_2$) | 72 |
| Titanium dioxide ($TiO_2$) | 8 |
| Boron oxide ($B_2O_3$) | 20 |

The above components in finely divided state are milled together to form a homogeneous mixture, which is heated sufficiently high to form a liquid glass. The resulting glass, when cold, is pulverized and then used as all or a substantial part of a bond for titanium dioxide.

Preparation of ceramic body

| | Parts by weight |
|---|---|
| Titanium dioxide | 95 |
| Above-described glass | 5 |

The finely divided titanium dioxide and glass are wet or dry milled together to form a homogeneous mixture. If wet milled, the mixture is then partly or completely dried, but preferably it is dried to a moisture content of about 5 or 6 per cent. The mass is shaped, for example, by compressing by any suitable means and at any suitable pressure. For instance, the mass may be pressed into shape in a hardened steel mold under a hydraulic pressure of 500 to 20,000 pounds per square inch or more. The "green" compressed mass is fired in an oxidizing or inert atmosphere at any suitable temperature until it has become thoroughly vitrified. The temperature of firing ordinarily will be within the range of about 1150° to about 1450° C., depending upon the melting point of the particular glass, particle size of the titania, time of firing and other influencing factors. I have found that in most cases firing to Orton cone 10, which corresponds to a temperature of about 1260° C., in a commercial tunnel kiln 400 feet long gives a completely vitrified product. The compositions may be matured in a few hours in a laboratory kiln if fired to about 1350° C.

EXAMPLE 2

| | Parts by weight |
|---|---|
| Titanium dioxide | 90 |
| Glass of Example 1 | 10 |

The same process is followed as described under Example 1.

EXAMPLE 3

*Preparation of glass*

| | Parts by weight |
|---|---|
| Silica ($SiO_2$) | 39.8 |
| Titanium dioxide ($TiO_2$) | 16.8 |
| Aluminum oxide ($Al_2O_3$) | 13.8 |
| Calcium oxide (CaO) | 29.6 |

The above components in finely divided state are mixed and heated to form a fluid glass as described with reference to the glass of Example 1.

*Preparation of ceramic body*

| | Parts by weight |
|---|---|
| Titanium dioxide | 95 |
| Above-described glass | 5 |

Essentially the same process is followed in preparing the ceramic body as described under Example 1.

EXAMPLE 4

| | Parts by weight |
|---|---|
| Titanium dioxide | 93 |
| Glass of Example 3 | 7 |

The same process is followed as described under Example 1 with reference to the preparation of the ceramic body.

EXAMPLE 5

| | Parts by weight |
|---|---|
| Titanium dioxide | 90 |
| Glass of Example 3 | 10 |

The same process is followed as described under Example 1 with reference to the preparation of the ceramic body.

EXAMPLE 6

*Preparation of glass*

| | Parts by weight |
|---|---|
| Titanium dioxide | 29.8 |
| Silica | 33.6 |
| Aluminum oxide | 11.6 |
| Calcium oxide | 25.0 |

The above components in finely divided state are mixed and heated to form a fluid glass as described with reference to the glass of Example 1.

*Preparation of ceramic body*

| | Parts by weight |
|---|---|
| Titanium dioxide | 93 |
| Above-described glass | 7 |

Essentially the same process is followed in preparing the ceramic body as described under Example 1.

EXAMPLE 7

*Preparation of glass*

| | Parts by weight |
|---|---|
| Titanium dioxide | 15 |
| Silica | 18 |
| Aluminum oxide | 2 |
| Lead oxide (PbO) | 65 |

The above components in finely divided state are mixed and heated to form a fluid glass as described with reference to the glass of Example 1.

*Preparation of ceramic body*

| | Parts by weight |
|---|---|
| Titanium dioxide | 93 |
| Above-described glass | 7 |

Essentially the same process in preparing the ceramic body as described under Example 1.

The vitrified ceramic materials made as described under the foregoing examples are suitable for use as condensers or capacitors. The sintered or vitrified compositions are mechanically strong, dense, homogeneous, have a high dielectric strength, a low power factor and a high dielectric constant. In some cases the power factor is below 0.0002 when measured at 25° C. and 1000 kilocycles and is of the order of mica.

In Table I are shown the average values for power factor and dielectric constant at 25° C. and 1000 kilocycles on representative samples of vitrified bodies in the form of discs approximately ¼ inch thick made as described under each of Examples 1 to 7, inclusive.

*Table I*

| | Example | | | | | | |
|---|---|---|---|---|---|---|---|
| | 1 | 2 | 3 | 4 | 5 | 6 | 7 |
| Power factor | 0.0010 | 0.0007 | 0.0004 | 0.0004 | 0.0003 | 0.0002 | 0.0003 |
| Dielectric constant | 103 | 85 | 112 | 97 | 103 | 102 | 102 |
| Approximate diameter of test discs, in inches | 2¼ | 2¼ | 2¼ | 4½ | 2¼ | 4½ | 4½ |

The dielectric strength of the new ceramic materials on a 60-cycle A. C. puncture voltage test in air is of the order of 100 to 150 volts per mil thickness.

By varying the proportions of the different components, sintered compositions of varying physical and electrical characteristics may be obtained. In general, however, the raw ceramic mix should contain from about 40 to 95 or more parts $TiO_2$ to about 60 to 5 or less parts of a preformed glass free from alkalies and adapted to bond the titania. The mix preferably contains from about 80 to 95 parts $TiO_4$ to about 20 to 5 parts of such a glass. The preformed glass may be replaced in part by non-clayey (clay-free) components adapted to bond titanium dioxide particles into a dense, homogeneous mass of high dielectric strength, for example, by magnesia, beryllia, calcium titanium silicate, or mixtures of two or more such substances.

What I claim as new and desire to secure by Letters Patent of the United States is:

1. A ceramic mix especially adapted for the production of matured ceramic materials having a high dielectric constant and a low power factor, said mix containing, by weight, from about 40 to 95 parts titanium dioxide and from about 60 to 5 parts of a clay-free inorganic binder adapted to bond the titanium dioxide into a dense mass when the mix is fired to vitrification, said binder comprising a preformed, substantially alkali-free titania glass.

2. A dense, vitrified ceramic material comprising titanium dioxide and a clay-free bonding agent, said bonding agent comprising a preformed, substantially alkali-free titania glass.

3. A dense, homogeneous mass of titanium dioxide particles bonded together with from about 5 to 60 per cent by weight of the whole of a clay-free inorganic binder, said binder comprising a preformed, substantially alkali-free glass containing titanium dioxide as an essential component.

4. A ceramic material having a high dielectric constant and a low power factor and comprising a fired mixture containing 40 to 95 per cent by weight of titanium dioxide and substantially all the remainder of said mixture being a clay-free bonding medium, said bonding medium comprising a preformed, substantially alkali-free titania glass.

5. A dense ceramic material comprising the resultant of firing at an elevated temperature a mixture of, by weight, 80 to 95 parts of titanium dioxide and 20 to 5 parts of a clay-free inorganic binder, said binder comprising a preformed, substantially alkali-free glass produced from a mixture of oxides of titanium, silicon and boron.

6. A dense ceramic material having a high dielectric constant and a low power factor and obtained by firing to vitrification a mixture of, by weight, 80 to 95 parts of titanium dioxide and 20 to 5 parts of a clay-free inorganic binder, said binder comprising a preformed, substantially alkali-free glass produced from a mixture of oxides of titanium, silicon, aluminum and calcium.

7. A matured ceramic material having a high dielectric constant and a low power factor and obtained by firing to vitrification a mixture of approximately 93 parts by weight of titanium dioxide and approximately 7 parts by weight of a preformed glass produced from a mixture of the following substances approximately in the proportions stated:

| | Parts by weight |
|---|---|
| Titanium dioxide | 29.8 |
| Silica | 33.6 |
| Aluminum oxide | 11.6 |
| Calcium oxide | 25.0 |

8. A process of producing a dense ceramic insulating material of high dielectric constant which comprises preparing a ceramic mix containing, by weight, from about 40 to 95 parts titanium dioxide and from about 60 to 5 parts of clay-free inorganic binder, said binder comprising a preformed, substantially alkali-free titania glass, and firing said mix to vitrification.

9. A matured ceramic material having a high dielectric constant and a low power factor and obtained by firing to vitrification a mixture of, by weight, 80 to 95 parts titanium dioxide and 20 to 5 parts of a preformed glass produced from a mixture of the following substances approximately in the proportions stated:

| | Parts by weight |
|---|---|
| Titanium dioxide | 29.8 |
| Silica | 33.6 |
| Aluminum oxide | 11.6 |
| Calcium oxide | 25.0 |

10. A dense ceramic material having a high dielectric constant and a low power factor and obtained by firing to vitrification a mixture of, by weight, 80 to 95 parts titanium dioxide and 20 to 5 parts of a clay-free inorganic binder, said binder comprising a preformed, substantially alkali-free glass produced from a mixture consisting of PbO, $TiO_2$, $SiO_2$ and $Al_2O_3$.

LOUIS NAVIAS.

CERTIFICATE OF CORRECTION.

Patent No. 2,220,775.                                November 5, 1940.

LOUIS NAVIAS.

It is hereby certified that error appears in the printed specification of the above numbered patent requiring correction as follows: Page 1, first column, line 14, for the word "titanium" first occurrence, read --titania--; page 2, second column, line 50, for "$Ti0_4$" read --$Ti0_2$--; page 3, second column, line 13, claim 8, after "of" insert --a--; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.